United States Patent [19]

Macksoud

[11] 4,336,733
[45] Jun. 29, 1982

[54] ROCKING ARM SAW

[76] Inventor: Albert A. Macksoud, R.R. #1, Leamington, Ontario, Canada, N8H 3V4

[21] Appl. No.: 157,073

[22] Filed: Jun. 6, 1980

[51] Int. Cl.³ .................... B27B 5/06; B27B 5/18; B23D 45/04
[52] U.S. Cl. .................... 83/477.2; 83/483; 83/490; 144/285
[58] Field of Search .............. 83/490, 477.2, 468, 83/581, 461, 745, 574, 483; 144/285, 286

[56] References Cited

U.S. PATENT DOCUMENTS

| | | | |
|---|---|---|---|
| 469,447 | 2/1892 | Hodges | 83/490 X |
| 1,584,086 | 5/1926 | Fonda | 83/490 X |
| 2,208,582 | 7/1940 | Hollister | 83/490 X |
| 2,505,958 | 5/1950 | Grierson | 83/490 X |
| 2,686,350 | 8/1954 | Payne | 83/490 X |
| 3,036,608 | 5/1962 | Weber | 144/285 |

Primary Examiner—Donald R. Schran

Attorney, Agent, or Firm—Cullen, Sloman, Cantor, Grauer, Scott & Rutherford

[57] ABSTRACT

A rocking arm saw is disclosed which may be used in one mode with an operating handle as a pull-through power saw for accurate cross or angle cutting while being readily convertable by removal of the handle to a table saw for ripping or groove cutting. The saw in its free standing form comprises a cutting surface platform and work table top, a subjacent box-like machinery housing, and a base support ventilating structure sized to provide a carrying box for the housing. When used as a pull-through saw, the rocking arm is urged elastically through its forward cutting stroke and biased rearwardly to a blade retracted position. The table top is thus maintained free of blade obstruction since the blade is protectively shielded beneath the cutting surface upon the user releasing the operating handle. The motor and saw blade, mounted on the rocking arm, are adjustable in inclination about one pivotal axis and adjustable angularly on a bearing surface around a second pivotal axis to maintain the blade cutting plane square relative to the table top cutting surface.

4 Claims, 12 Drawing Figures

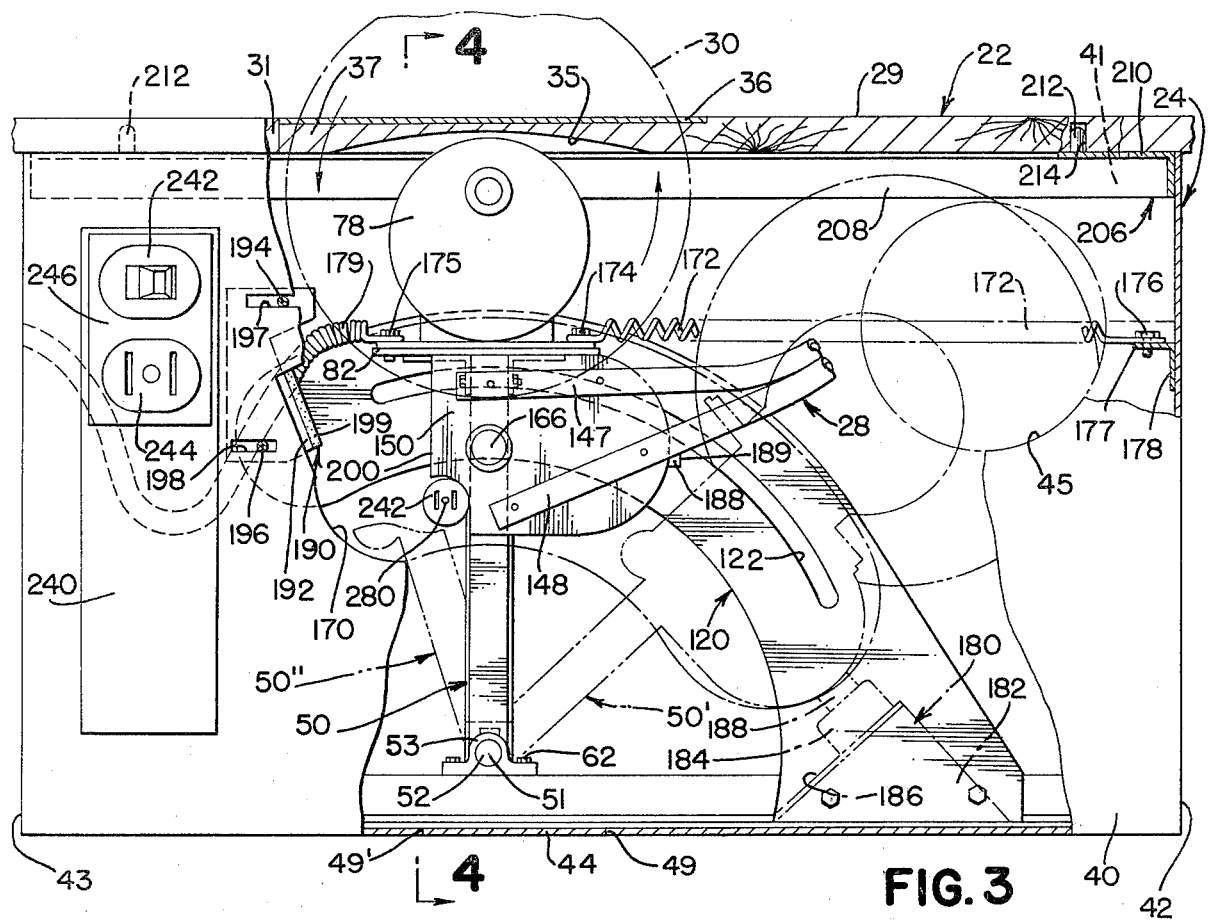
FIG. 3
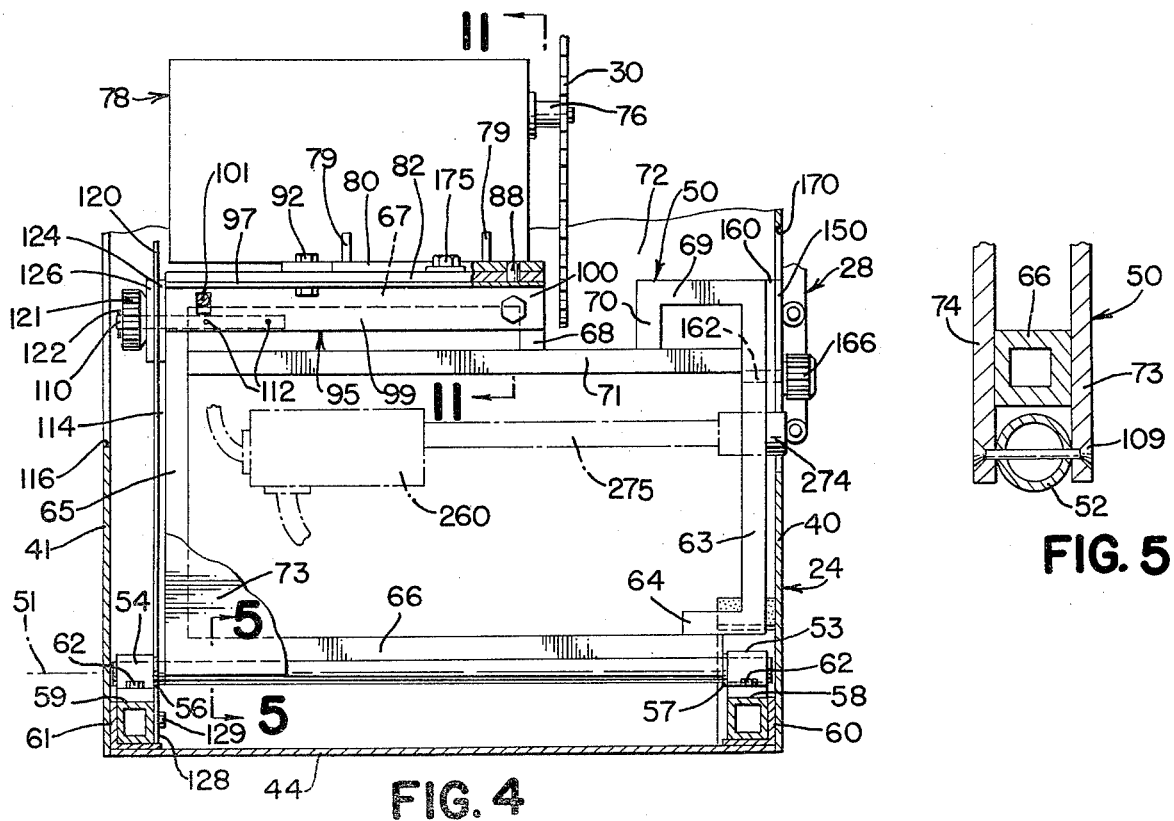
FIG. 4
FIG. 5

ROCKING ARM SAW

BACKGROUND OF THE INVENTION

This invention relates to power saws and more particularly to a rocking arm circular saw capable of operating either as a pull-through cutoff type saw or as a bench saw.

Various bench or table saws have been disclosed in prior art patents which are designed to be compact for transporting to a job site. An example of such a bench saw is shown in U.S. Pat. No. 4,068,550 to Gray, et al, issued Jan 17, 1978. One problem with such prior art transportable power saws is that they are useful mainly for ripping as they lack a rigid table top, blade adjustability, etc. As a result there has long been a need for a transportable power saw capable of performing accurate work such as crosscutting, angle cutting, groove cutting or the like provided by conventional workshop power saws.

A further problem with transportable power saws, such as the patented Gray, et al bench saw, is that they do not provide a large working surface supported on a firm foundation enabling accurate ripping or cross-cutting of sheet material such as wall panels. It is thus usually necessary to use a separate saw, such as handheld power circular saw, to perform cross or angle cutting operations at a job site.

Still another problem with transportable power saws is that they are not at a free-standing height when assembled to provide a standard table top working surface.

Still another problem with transportable power saws is that they do not provide sufficient air venting to the motor to insure that the motor will not over heat after extended use. A related problem is that such transportable power saws lack a proper saw dust collection arrangement to prevent the accumulation of saw dust around the motor reducing the ventilating air supply causing further motor heat build-up.

SUMMARY OF THE INVENTION

The present invention provides an improved, readily transportable power saw capable of use either as a pull-through cut-off saw or as an adjustable bench saw. A motor carrying a circular saw blade is mounted on a pivotal rocking arm member for arcuate swinging movement about a horizontally disposed axis within the saw housing. The saw blade moves in a vertical plane from a retracted position within the housing below a material support surface in a pull-through cutting stroke for advancement through an elongated slot in the support surface before cutting the material. Resilient biasing means normally retains the saw blade at its retracted position below the work surface. A motor control handle attachment is gripped by the operator to energize the motor and advance the circular saw blade in an arcuate cutting path upwardly toward the work surface and through the elongated slot to cut the material.

The resilient biasing means further assists in uniform equalizing movement of the blade by urging the blade yieldingly from its retracted position during its pull-through cutting stroke. The rocking arm member supporting the drive motor and blade is constantly urged elastically by first biasing means toward a first over center retracted stop position. In a similar manner the rocking arm member, together with the drive motor and saw blade, is constantly being urged elastically by second biasing means assisting the operator in advancing the saw blade from its retracted position through its cutting stroke. The first biasing means automatically returns the cutting blade to its retracted position upon the operator releasing the control handle connected to the rocking arm member.

The motor base is mounted on a rocker arm mounting plate for pivotal adjustment about one axis wherein the motor shaft is oriented in coplanar parallel relation with the pivotal axis of the rocker arm. The arm mounting plate is pivotally adjustable about a second axis wherein the inclination of the blade is placed in perpendicular relation to the material support surface. Thus, the saw blade can be maintained square with the table top cutting surface with a pair of ready pivotal adjustments between the motor base and the rocker arm member mounting plate.

It is thus a feature of the present invention to provide a power saw having the capabilities of both a pull-through cutting saw and a bench saw.

It is another feature of the present invention to provide a power saw as set forth above wherein the saw blade in its pull-through cutting mode is automatically retracted beneath the material support surface upon completion of the cutting stroke thereby providing a working surface unobstructed by the saw blade.

It is still another feature of the present invention to provide a readily transportable combined rocking arm and bench saw having a novel carrying box adapted for use as a base for a free-standing saw at a job site.

It is a feature of the present invention to provide a freestanding readily transportable power saw wherein the saw housing and base support box provide interconnected aperture means wherein the drive motor is readily supplied with venting air to prevent over heating while the support box functions to collect saw dust for ready disposal.

It is still another feature of the present invention to provide a rocking arm power saw unit wherein the circular saw blade and drive motor unit is readily adjustable about both a vertical and horizontal blade orienting axis.

The foregoing objects and advantages of the present invention, together with the objects and advantages which may be attained by its use, will become more apparent upon reading the following detailed description of which the attached drawings form a part.

DESCRIPTION OF THE DRAWINGS

FIG. 3 is a view similar to FIG. 2 showing the right side of the saw housing;

FIG. 4 is a fragmentary vertical sectional view taken substantially on the line 4—4 of FIG. 3;

FIG. 5 is an enlarged fragmentary vertical sectional view taken on the line 5—5 of FIG. 4;

DESCRIPTION OF THE PREFERRED EMBODIMENT

Figure 1:
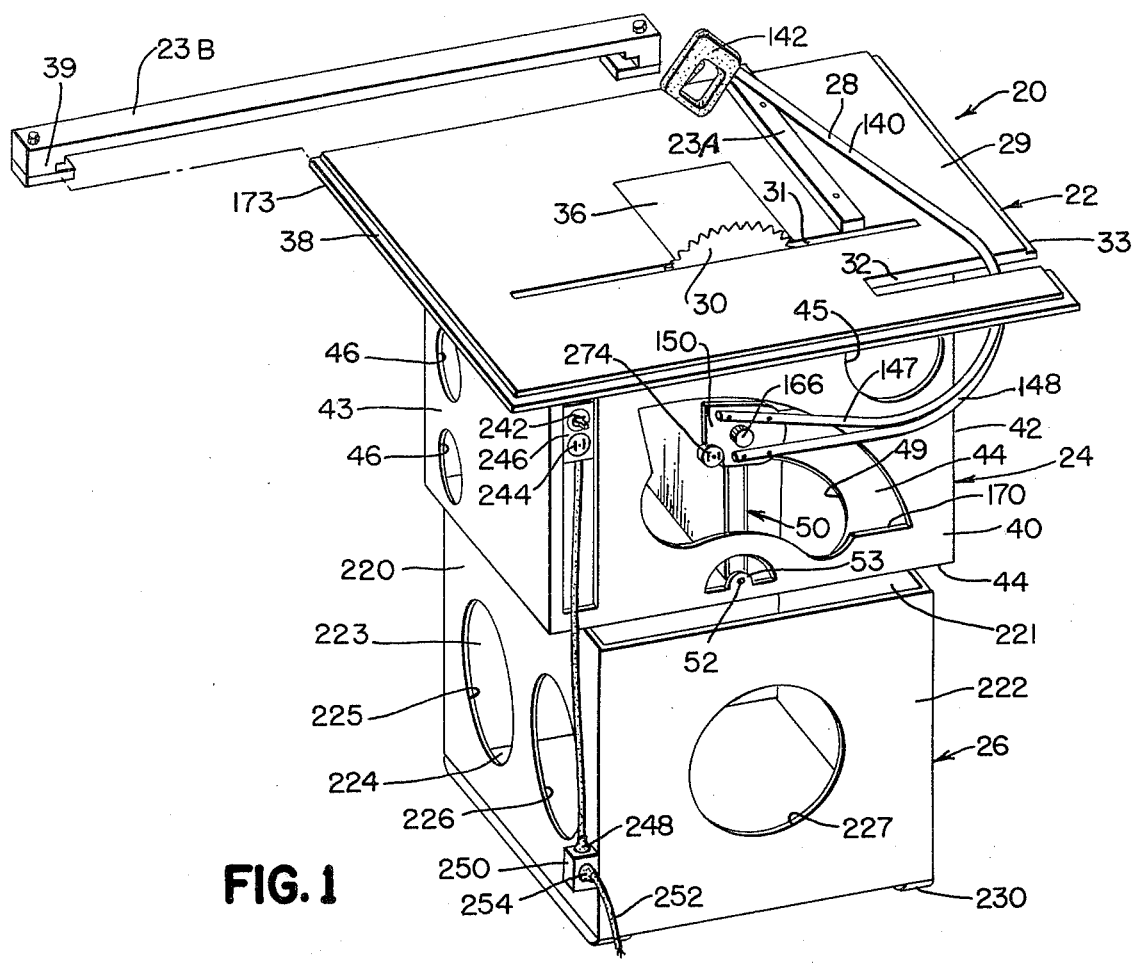
FIG. 1 is a perspective view of a rocking arm power saw showing the present invention in its free standing pull-through cutting arrangement.

Referring initially to FIG. 1, a preferred form of the invention is shown as a free-standing power saw generally indicated at 20 comprising a top cover or platform 22 and guide fence 23 supported by housing means in the form of a generally box-shaped housing 24 which is in turn supported on a lower base support in the form of a rectangular open-top box 26. The saw is controlled in one mode by an operating arm means or handle generally indicated at 28.

The platform 22 provides an upper material supporting and cutting surface 29 for receiving and supporting the material to be cut by saw blade means in the form of a circular toothed saw blade 30 for rotation about an axis below the surface 29. The saw blade 30 in its cutting mode extends through elongated aperture means in the form of a longitudinally extending slot 31.

Second aperture means is provided in the platform 22 in the form of an open-ended handle slot 32 having its open end located in the front edge 33 of the platform 22. In the disclosed embodiment the opening or handle slot has an overall longitudinal length of about 10 inches and a width of about 2 inches. As seen in FIG. 1, the slot 32 is located outboard of the housing for ready reception of the operating handle 28 in a manner to be described.

As seen in FIG. 3, the under surface of the platform 22 has a reduced section shown as an arcuate-shaped motor cut-out or recess 35. The upper working surface 29 of the platform 22 is preferably recessed to receive a sheet metal insert panel 36 having a substantially rectangular shape in plan. FIG. 3 shows the metal panel formed with a right angle flange 37 which extends along and defines a portion of the left-hand side edge of the blade slot 31. The flange 37 thus provides panel rigidity to allow the panel to span the motor cut-out area. The flange has a depth of about one inch so as to be substantially equal to the thickness of the top cover or platform 22.

FIG. 1 shows the rectangular perimeter of the platform 22 having a notched edge portion 38 providing track means for receiving a complementary stepped portion 39 of the saw guide ripping fence 23. A cross cutting guide 23A is shown held in place by means of two pins located in bores in the platform surface.

FIGS. 1 through 4 disclose the box-shaped housing 24 providing an opposed pair of right and left side walls 40 and 41 respectively, a pair of back and front end walls 42 and 43 respectively, and a bottom wall 44. Each of the side walls have one or more aperture means therein as tipified by the circular aperture 45 in side wall 40, apertures 46 in front end wall 43, circular apertures 47 and 48 in side wall 41, and apertures 49 and 49' in the bottom wall 44 (FIG. 3). The apertures in the side, end, and bottom walls of the housing 24 serve as air ventilating flow passages to prevent over heating of the drive motor while apertures 49 and 49' allow saw dust to exit through the bottom wall 44 into the lower base or box 26 to maintain free air flow around the motor further assisting in the ventilation of the housing 24.

Rocking arm means in the form of a rocker arm framed panel member generally indicated at 50 is pivotally supported or mounted adjacent its one end within the housing 24 for swingable movement about an axis disposed parallel with the work surface 29. FIGS. 3 and 4 show the rocker arm pivotal axis at 51 being established by an axle 52 disposed horizontally within the housing 24 adjacent the bottom wall 44 by means of a pair of laterally spaced journal support members or knuckles 53 and 54. FIG. 4 shows a left hand spacer member 56 intermediate the knuckle 54 and the rocker arm 50 and one or more stacked washers 57 intermediate the right hand knuckle 53 and the arm 50.

A pair of longitudinally extending square tube members 58 and 59 are mounted along the side and bottom wall junctures by means of co-extensive corner square angles 60 and 61, respectively. Bolts 62 secure the journal members 53 and 54 on the upper surface of their associated square tubes 58 and 59 so as to position the axle 52 in a transverse normal or perpendicular relation to the side walls 40 and 41. As seen in FIG. 3, the axle 52 is located in assymetrical relation relative to the transverse center line of the housing with the axle 52 being located closer to the housing back wall 43. In the disclosed form, the axle 52 is located about 10 inches from the front wall 43 and about 14 inches from the back wall 42.

FIG. 4 shows the rocker arm or panel member 50 formed by means of a right side square tube 63 extending vertically with its lower end terminating in a right angle foot portion 64. A corresponding left side vertical tube 65 of the rocker arm is connected to the foot portion 64 by means of a transverse lower square tube 66 enjoined to the tube portion 64 in a suitable manner such as by welding.

The rocker arm 50 further includes a first upper square tube portion 67 extending from the upper end of side tube 65 and terminating in a right angle bend portion 68. A corresponding second upper short tube portion 69 extends from the upper end of side tube 63 and terminates in a right angle downwardly directed tube portion 70. The tube portions 68 and 70 abut against the upper surface of a transverse support tube 71 to establish a rectangular saw blade space 72. The square tube frame work of the rocker panel is preferably joined at its right angle junctures by mitred 45° angle welded joints indicated in FIG. 4. The rocker panel square tube framework is completed by means of a pair of cover sheets 73 and 74 suitably secured thereto as by brazing or welding to provide a uniform rigid structure.

Figure 8:
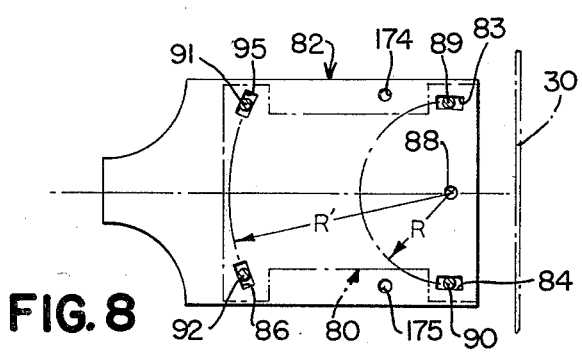
FIG. 8 is a detail view of the upper bearing surface of the motor mounting plate.
Figure 11:
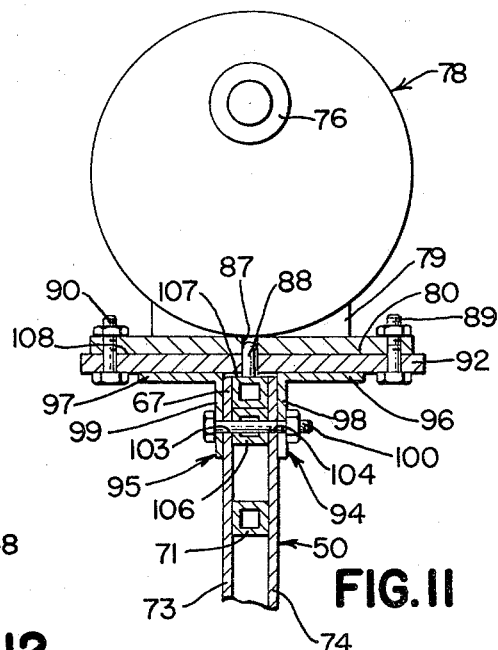
FIG. 11 is a fragmentary, vertical sectional view taken substantially on the line 11—11 of FIG. 4.

As seen in FIGS. 4 and 11, saw blade drive means, in the form of an electric motor 78, is adjustably mounted against the outer end of the rocker panel member 50 by means of the motor cradle members 79 joining motor base or plate 80 to the motor cover. The motor base 80 is retained on the upper load bearing surface of a rocker arm or panel motor mounting plate generally indicated at 82 as shown in FIG. 8. The mounting plate 82 includes four arcuately shaped adjustment slots shown by a front pair of adjustment slots 83 and 84 and a rear pair of adjustment slots 85 and 86. The front slots 83 and 84 are adapted to receive retaining pin means in the form of machine bolts 89 and 90 respectively, which extend upwardly through aligned apertures in the motor base 80. Each of the mounting bolts is secured by threaded nuts to fixedly retain the motor base in flush abutting relation on the upper bearing surface of the mounting plate 82.

Figure 10:
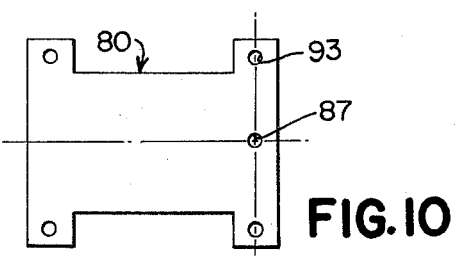
FIG. 10 is a detail plane view of the motor base plate.

FIG. 11 shows the motor base 80 having a bore 87 aligned on its longitudinal center line and the transverse center of the bolts 89 and 90 for freely fitting over an anchoring element or a pivotal adjustment pin 88 fixedly retained so as to extend from the upper bearing surface of the plate 82. As seen in FIG. 8, the pin 88 defines the center of a pair of radii R and R'. The radius R locates the arcuate center of the front adjustment slots 83 and 84 while the radius R' locates the radial arc of the rear adjustment slots 85 and 86. As the motor mounting bolts 89, 90, 91 and 92 are fixed with respect to the motor base by being received in the base circular apertures, indicated at 93 in FIG. 10, the motor base 80 and motor 78 is adapted for pivotal movement about the axis of pin 88. The mounting plate arcuate adjustment slots 83, 84 and 85, 86 are each spaced equidistant from the anchoring element axis. In this manner, the circular saw blade 30, mounted on the drive shaft 76, is adjustably positionable such that the cutting plane of the circular saw blade 30 is perpendicular to the pivotal axis 51 of the axle 52.

Figure 9:
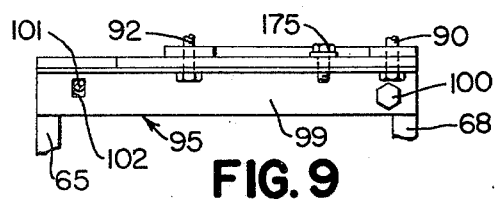
FIG. 9 is a side elevational view of the motor base plate, arm mounting plate and left-hand arm moving angle.

As seen in FIGS. 9 and 11, the motor mounting plate 82 is retained adjacent the outer end of the rocker arm or panel 50 by means of a pair of right angle brackets 94 and 95 having their outwardly extending legs 96 and 97 respectively, fixedly secured to the under surface of the plate 82 such as by welding. The angle bracket vertically extending legs 98 and 99 respectively, are adjustably retained on the rocker panel by means of a front pivot pin in the form of through bolt 100 and a rear bolt 101.

As seen in FIG. 11 the front bolt 100 extends through aligned circular apertures 103 and 104 in the panel cover plates 73 and 74 respectively, together with a pair of aligned circular aperture through a second top cross tubular member 106. As seen in FIG. 11 the outer edge 107 of the rocker panel is located in spaced relation from the under surface of the mounting plate 82. By means of the above-described arrangement of parts the transverse bolt 101 extending through adjustment slots in the legs 98 and 99 of the angle brackets, as indicated by the slot 102 in leg 99, allowing the motor to be adjustably rotated about the axis of bolt 100 to position the motor at a variety of angular inclinations. This motor mounting arrangement positions the longitudinally extending motor drive shaft 76 in parallel co-planar relation with the arm pivotal axis 51, by means of the motor base being pivoted angularly about the axis of pin 88 relative to the plate 82 bearing surface 108. By adjusting the angle inclination of the motor shaft 76, the cutting plane of the circular saw blade 30 may be positionable so as to intersect the pivotal axis 51 in a transverse or perpendicular manner. The cutting plane of the blade 30 is thus located square to the saw table top cutting surface 29.

With reference to FIG. 5 the rocker arm or panel 50 is shown fixedly positionable on the axle 52 by means of a plurality of fasteners such as flat headed rivet members 109 extending through aligned apertures in the axle 52 and aligned apertures in the cover plates 73 and 74. In this way, the axle is rigidly retained between the arm cover plates and the bottom square tube 66.

Figure 2:
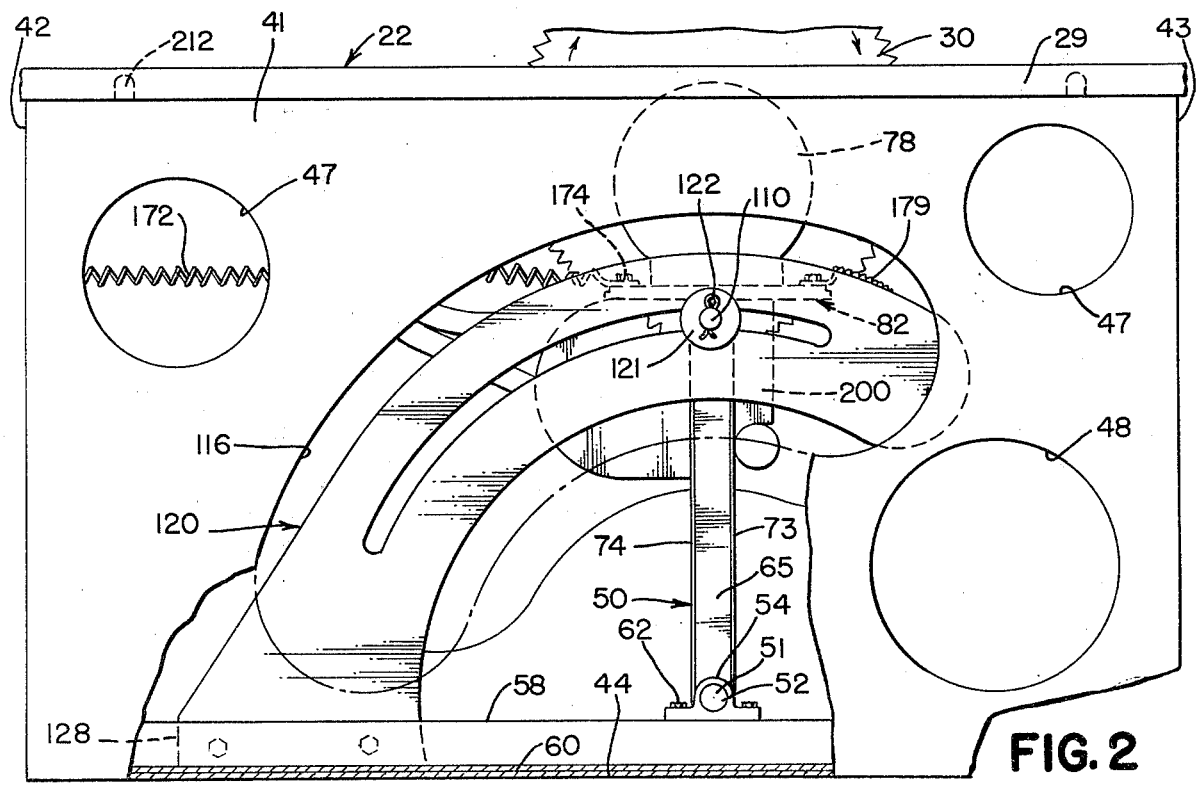
FIG. 2 is an enlarged fragmentary elevational view with parts cut away showing the left side of the saw housing.

FIGS. 2 and 4 show a rocker arm or panel retainer and follower member in the form of a laterally projecting bolt 110 extending longitudinally into the square sectioned passage of cross tube member 106 and suitably retained therein as by means of rivet members 112. The follower or bolt 110 extends laterally from the side edge 114 of the rocker panel located adjacent the interface of the housing left side wall 41.

FIG. 2 shows the side wall 41 formed with a kidney-shaped or arcuate access aperture 116 which partly conforms with an arcuate shaped saber member, generally indicated at 120. The saber member 120 has follower guide means in the form of an arcuate slot 122 having a radius of curvature with its center located on the rocker arm pivotal axis 51. The follower bolt 110 extends through the slot 122 and has received on its free end retaining means in the form of a knurled knob 121 mounted on follower bolt and suitably secured thereon by a fastener such as a cotter pin 122. A pair of inner and outer holder washers are disposed intermediate the panel edge 114 and the saber with the outer washer 126 located intermediate the saber member and the knob 121.

The saber member 120 has a base portion 128 fixedly retained to the inner surface of square tube 59 such as by bolts 129. The saber member 120 is formed of a semi-rigid sheet material such as sheet steel and extends upwardly from its base portion 128 in a plane substantially parallel to the cutting plane of the saw blade 30, intermediate the housing left side wall 41 and the rocker arm edge portion 114.

By virtue of this arrangement the retaining means or knob 121 may be backed off towards the outer free end of the follower to allow the rocker arm or panel 50 and follower 110 to freely pivot about the axis 51 in a swingable manner when the saw is being used in its pull-through cutting mode of operation. By threading the knob 121 inwardly on the follower 110, the knob serves as a releasable locking means for adjustably retaining the rocker arm 50 to provide a variety of angular adjustments. This selective positioning of the rocker arm accordingly determines the position of the saw blade 30 with respect to the material supporting surface 29 when the saw is being used in its table saw mode of operation. Thus, in the disclosed embodiment, the cutting teeth of the saw blade 30 may be adjustably positioned above the working surface 29 to saw grooves in material at a variety of predetermined depths.

The saw blade 30 can be of various diameters as, for example, from 6 inches to 10 inches with the blade shown having a diameter of about 9 inches. With the use of a 10-inch blade the saw may cut 4×4 stock material in a cross-cut pull-through manner.

It will be noted that the cantilevered supported arrangement of the semi-rigid saber member 120 allows the free end of the saber to flex in a lateral direction to accommodate for tolerance variations. This insures a free path of travel of the rocker arm or panel 50 with respect to the saber without binding between related parts or otherwise interfering with the setting and operation of the saw.

Figure 6:
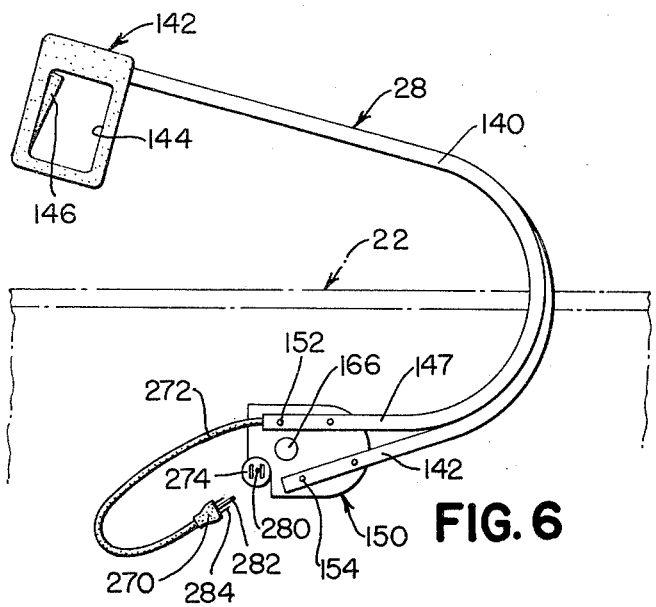
FIG. 6 is an enlarged, detail side elevational view of the saw control handle.
Figure 7:
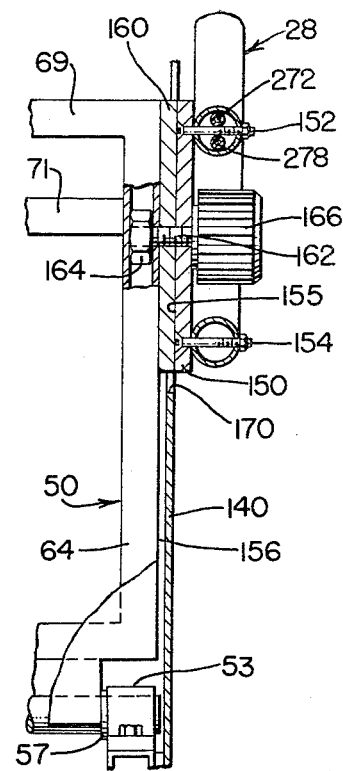
FIG. 7 is an enlarged, fragmentary cross-sectional view of a portion of FIG. 4.

As seen in FIGS. 6 and 7, the operating handle or arm 28 of the power saw is preferably in the form of a substantially J-shaped rod or tube 140 having an operating handle grip 142 secured on the free end of the stem portion of the tube. The handle grip aperture 144 includes a pivotal trigger 146 which is operative when depressed to close an electrical switch upon being grasped by the operator. The curved end of the J-shaped tube 140 is bifurcated to provide an upper tubular portion 147 and a lower tubular portion 148.

A handle attaching plate 150 is secured to both free ends of the bifurcated tube portions 147 and 148 by a suitable means such as through bolts 152 and 154 respectively, having flat counter sunk heads flush with the inner surface 155 of the plate 150. FIG. 7 shows the right-hand side edge 156 of the rocker square tube 64 positioned adjacent the inner wall surface of right side wall 40. The tube 64 has secured thereto, such as by welding, an inner handle securing gusset plate 160 conforming in plan to the shape of the attaching plate 150 and adapted to mate therewith in flush abutting relation when secured together by attaching means. In the disclosed form, a threaded stud member or lock bolt 162 is fixedly retained to the square tube 64 such as by being threadably received by a nut 164 located within the square opening of the tube 64. A knurled knob 166 is fixed on the outer end of the lock bolt 162 to allow ready threaded reception of the bolt 162 with the rocker arm vertical tube member 64. The handle attaching plate 150 is thus releasably locked to the outer surface of inner rocker arm gusset plate 160.

Because of this arrangement, as seen in FIGS. 3 and 7, the plates 150 and 160 travel in an arcuate path substantially defined by the arcuate shaped access aperture 170 formed in the right side wall 40 of the housing. FIG. 7 shows the handle plate 150 in combination with the inner gusset plate 160 to space the handle 28 a predetermined distance from the outer surface of the right side wall 40. The handle 28 is thus free to pivot the rocker arm member 50 in an arcuate path parallel to and disposed outwardly from the wall 40 while traveling within the platform open-ended handle slot 32. This permits the ready removal of the handle 28 by the single securing means in the form of the lock bolt 162 readily unthreaded and disengaged by means of its knob 166.

FIG. 3 shows the operating handle 28 enabling hinging movement of the rocker arm member 50 from a blade retracted position within the housing 24 as shown in phantom at 50′ wherein the blade 30 is positioned beneath the upper working surface 29, and adjacent the front wall 42. An important feature of the present invention involves the arm member 50 being constantly urged elastically by first biasing means towards a first over center retracted 50′ position. In its disclosed form, the first resilient biasing means are provided in the form of a tension coil spring 172 connected between the rocker arm mounting plate 82 and the back wall 42 by bolts 174 and 176 respectively. Bolt 174 is threadably attached to the mounting plate 82 while the bolt 176 extends through an upper leg 177 of a suitable mounting bracket 178 secured as by welding on the inner surface of back wall 42.

Second resilient biasing means in the form of a second tension coil spring 179 is connected between the mounting plate 82 and the housing front end wall 43 in the same manner as spring 172 that is, by a bolt 175 secured to the plate 82. Front end wall attaching means, (not shown) may be by a bracket of the type shown at 178 for the spring 172.

The first retracting biasing means or coil spring 172 has a predetermined spring constant greater than the spring constant of spring 179 such that it constantly urges or biases the rocker arm member 50 and the motor 78 to a retracted position indicated at 50′ in FIG. 3. The second biasing means in the form of a coil spring 179 operates to assist the user in advancing the rocker arm member, by means of the operating handle 28, through an arcuate path wherein the blade cutting portion is advanced upwardly through the longitudinally disposed slot 31 in the working surface 29 to cut material supported thereon. Upon the saw blade 30 completing its cutting stroke, the user may release the operating handle allowing the spring biasing means 172 to automatically return the saw blade cutting portion to its retracted biased portion beneath the surface 29.

It will be noted in FIG. 1 that in the pull-through cross-cutting stroke, the saw blade is moved longitudinally in the same direction as its rotation. Ripping is done with the work or material fed on the table top cutting surface 29 from the rear edge 33 to the front edge 173.

As seen in FIG. 3, stop means are provided in the housing 24 in the form of a stop member 180 having a triangular prism shaped support base 182 with a resilient stop pad 184 secured to the forward inclined face 186 of the stop member. A stop engaging bracket 188 is adjustably secured on the inner face of the arm gusset plate 160 for contacting the stop pad 184 with the rocker arm member in its phantom position shown at 50′.

When the saw of the present invention is being transported, the rocker arm may be moved to its maximum blade retracted position of 50′ and releasably retained. That is, with stop face 189 of the bracket 188 contacting stop 184 and tightening the retaining knob 121 clamping the washers 124 and 126 in engagement with the associated surfaces of the saber member 120.

Second stop means in the form of a second stop member, generally indicated at 190 in FIG. 3, includes a stop bracket portion 192 adjustably secured to the housing right side wall 40 by means of a pair of upper and lower bolts 194 and 196, slidably adjustable in longitudinal slots 197 and 198, respectively. The front stop 190 includes a bumper pad 199 operative to engage the forward edge 200 of the inner rocker arm gusset plate 160 to limit the forward travel of the rocker arm at a second over center position indicated in phantom at 50″ in FIG. 3. The stop pad 199 is located to engage the gusset plate edge 200 prior to the following pin 110 engaging the forward edge of the follower guide slot 122 preventing any stress being placed on the saber arm 120.

As seen in FIG. 3, the housing 24 includes an upper peripheral flange provided by right angle members extending therearound as indicated by the right angle member 206 having a vertical leg 208 secured to the inner surface of the housing side wall 41. Member 206 has an upper horizontal leg 210 adapted to support the table top cover or platform 22 by means of locating studs 212 being received in platform aligned bores 214.

FIG. 1 shows the saw in its free-standing assembly wherein the base open top box 26 provides a support for the housing 24. The box 26 includes a pair of opposed side walls 220 and 221, a pair of opposed end walls 222 and 223 and a bottom wall 224. Each of the box side walls has a plurality of venting apertures such as shown by the pair of venting holes 225 and 226 in the side wall 220. The end walls have similar venting apertures as shown by the venting hole 227 in the end wall 222. Because of the venting apertures in each of the side and end walls of the base stand box 26, together with its open top provides communication with the housing venting apertures in the form of the bottom wall opening 49 and 49′. Thus, a large volume of air flow is provided for the freestanding saw of FIG. 1 to insure adequate cooling of the motor 78. In addition, the open top support box 26 provides a convenient receptacle for collecting saw dust from the cutting blade 30.

FIG. 1 shows the box 26 having an overall height which, when combined with the height of the housing 24, positions the working surface 29 of the saw at a standard table top height above the supporting surface on which skids 230 of the box 26 rest. In the disclosed form, the box 26 has an overall height of about 15 and one-half inches while the housing 24 has an overall height of about 14 inches, which, together with the one inch thick platform 22, positions the working surface 29 to about 30 inches above the supporting ground or floor.

The open top box 26 is sized relative to the housing 24 such that the housing may be received in a nested-like fashion within the box 26. This arrangement allows the box 26 to serve as a carrying and storage case for the saw housing to provide a readily transportable unit which may be taken daily to a job site. As the weight of the saw housing 24, box 26, and platform 22 are about 35, 15 and 10 pounds respectively, the complete saw may be readily lifted into the trunk compartment of a conventional automobile. At the job site the housing 24 is merely removed from its nested position within the box 26 and the housing supported on the upper edges of the open top box. As seen in FIG. 1, the operator orients the housing in an angular relation on the box 26 such as turning the housing 90 degrees relative to the box.

Figure 12:
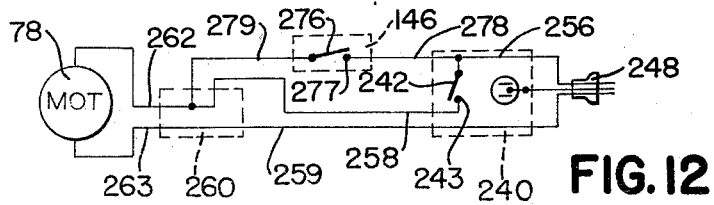
FIG. 12 is a schematic wiring diagram of a portion of the electrical control circuit of the saw.

As shown by the schematic wiring diagram of FIG. 12, an electrical wiring box, indicated in dashed lines at 240, includes a manual on-off switch 242 and a utility receptacle 244, receptacle for a light, power hand tool, etc., provided in a face plate shown at 246 in FIG. 3. In its table saw mode of operation, the plug 248 is plugged into a receptacle in junction box 250 (FIG. 1) which is in turn connected to a normal house supply current by means of an extension chord 252 and plug 254.

With the switch 242 in its closed position, engaging contact 243, the motor 78 is energized by power flowing from the electrical plug 248 via lines 256, 258 and return line 259 connected into a junction box 260. FIG. 4 shows the junction box 260 in phantom lines mounted on the rocker arm panel 73 having an electrical line 262 and 263 connecting the junction box 260 with the motor 78. In the disclosed form the motor 78 has a 12 AMP, 120 VAC, 1100 rpm rating.

When the saw of the present invention is used in its pull-through cross-cutting mode the handle plate 150 is mounted on the rocker arm plate 160 as described above. A handle plug 270 (FIG. 6) on the end of electrical chord 272 is inserted in an electrical receptacle 274 fixedly mounted on the rocker arm member 50 so as to be accessible through the side wall access opening 170. The receptacle 274 is connected via metal conduit 275 carrying electrical line means to the junction box 260.

FIG. 6 shows the pull handle electrical line 272 extending through the upper bifurcated tube portion 147 for connection to the trigger switch 146.

It will be noted in FIG. 3 that the receptacle 274 (not shown in FIG. 12) has a central aperture 280 for reception of an elongated prong 282 formed of a suitable insulating material such as nylon shown in FIG. 6. The nylon prong 282 extends outwardly beyond the electrical pair of prongs 284 of the plug 270. The plug 270 is thus adaptably received only in receptacle 274 and consequently cannot be inadvertently plugged into a hot receptacle such as a receptacle connected to a household current.

The wiring diagram of FIG. 12 shows that upon the saw being used in its pull-through mode of the operation the plug 270 is inserted in receptacle 274. The manual switch 242 is now moved to its open circuit position allowing the motor 78 to be energized by the user depressing the trigger 146 to close the trigger switch movable contact 276 to its fixed contact 277. The power thus flows to the motor from the electrical plug 248 via line 256, line 278 through the closed trigger switch 146, and line 279 to the junction box 260 and thence by line 262 to the motor. The return path via line 263, box 260 and line 259 from the motor is the same as for the bench saw mode of operation.

It will be apparent to those skilled in the art that the foregoing disclosure is exemplary in nature rather than limiting, the invention being limited only by the appended claims.

I claim:

1. In a saw of the type having a housing including a work piecesupporting surface provided with a slot through which a circular disk-type saw blade may selectively project from beneath said surface, a rocker arm pivotally mounted within said housing for swinging movement about an axis parallel with the rotational axis of said saw blade, motor means secured to said rocker arm for swinging movement therewith and for selectively causing said saw blade to rotate, a manually operable handle secured to said rocker arm and normally projecting above said surface for access by the saw operator, said rocker arm being movable by said handle between a first position wherein said saw blade is completely withdrawn below said surface and a second position wherein said saw blade projects upwardly through said slot for cutting of work pieces located on said surface, said handle permitting an operator to pull said saw blade through a fixed work piece for cutting thereof as said rocker arm blade is pulled from said first position toward said second position, locking means for selectively locking said rocker arm and saw blade in a fixed position relative to said surface to permit said saw to be utilized as a table saw with a portion of said blade projecting upwardly through said slot; the improved arrangement for mounting said motor means and for controlling the movement of said rocker arm comprising:

said motor means being mounted on the end of said rocker arm remote from the pivot axis thereof for swinging movement therewith and being located immediately beneath the underside of said surface when said saw blade projects through said slot, and the drive train from the motor to the saw blade being substantially fully enclosed to block accumulation of saw dust thereon;

resilient means urging said rocker arm from said second position toward said first position to cause said saw blade to be safely withdrawn beneath said surface unless it has been locked in an exposed position or unless a manually applied force is maintained to overcome the biasing force from said resilient means.

2. The saw of claim 1 wherein said housing is open-bottomed, and wherein said saw further includes a open-topped support structure which is dimensioned and shaped to receive the housing in nesting relationship to thereby serve as a storage and carrying case for the saw and housing, but which further functions as a support stand when said housing is removed therefrom and oriented in a non-nesting relationship and rested upon said support structure, said support structure and housing being dimensioned so that their combined height when arranged in said non-resting support relationship places said surface at a conventional working height, the open bottom of said housing and the open top of said support structure permitting saw dust generated by said saw blade to fall into said support structure to be retained therein until disposed of.

3. The saw of claim 1 wherein said handle contains a trigger-type motor control switch which is effective to energize said motor means only while being grasped by the operator.

4. The saw of claim 1 wherein said handle is readily removable so that the saw presents no obstructions on or above said surface which would interfere with use of said saw as a table saw on work pieces of large size.

* * * * *